United States Patent
Tanaka

(10) Patent No.: US 8,619,325 B2
(45) Date of Patent: Dec. 31, 2013

(54) IMAGE PROCESSING APPARATUS AND METHOD FOR DISCRIMINATING WHETHER DOCUMENT IS COLOR DOCUMENT OR BLACK AND WHITE DOCUMENT, IMAGE FORMING APPARATUS AND FACSIMILE MACHINE INCLUDING THE IMAGE PROCESSING APPARATUS AND COMPUTER READABLE RECORDING MEDIUM STORING IMAGE PROCESSING PROGRAM

(75) Inventor: Kunihiko Tanaka, Osaka (JP)

(73) Assignee: Kyocera Mita Corporation (JP)

(*) Notice: Subject to any disclaimer, the term of this patent is extended or adjusted under 35 U.S.C. 154(b) by 180 days.

(21) Appl. No.: 13/167,166

(22) Filed: Jun. 23, 2011

(65) Prior Publication Data

US 2011/0317186 A1 Dec. 29, 2011

(30) Foreign Application Priority Data

Jun. 29, 2010 (JP) ................................. 2010-147364

(51) Int. Cl.
- *G06K 15/00* (2006.01)
- *H04N 1/40* (2006.01)
- *H04N 1/04* (2006.01)
- *H04N 1/46* (2006.01)

(52) U.S. Cl.
USPC ............ 358/1.9; 358/2.1; 358/3.23; 358/474; 358/505

(58) Field of Classification Search
None
See application file for complete search history.

(56) References Cited

U.S. PATENT DOCUMENTS

| 5,557,416 | A | 9/1996 | Sasanuma et al. | |
|---|---|---|---|---|
| 5,719,681 | A | 2/1998 | Sasanuma et al. | |
| 2002/0001094 | A1* | 1/2002 | Yoshida et al. | 358/1.9 |
| 2008/0055677 | A1* | 3/2008 | Minamino | 358/514 |
| 2009/0041346 | A1* | 2/2009 | Tsutsumi | 382/167 |
| 2010/0215266 | A1* | 8/2010 | Higuchi | 382/167 |

FOREIGN PATENT DOCUMENTS

| JP | 6-113138 | 4/1994 |
|---|---|---|
| JP | 10-145623 | 5/1998 |
| JP | 2001-128024 | 5/2001 |
| JP | 2003-32499 | 1/2003 |

* cited by examiner

*Primary Examiner* — Benny Q Tieu
*Assistant Examiner* — Haris Sabah
(74) *Attorney, Agent, or Firm* — Gerald E. Hespos; Michael J. Porco; Matthew T. Hespos

(57) ABSTRACT

An image processing apparatus includes an image reading unit, a pixel color determining unit, an isolated point determining unit, and a document discriminating unit. The image reading unit scans a document to detect pixel values of color components of each pixel. The pixel color determining unit determines whether a color of each pixel is a specific color based on the detected pixel values. The isolated point determining unit determines whether each pixel is an isolated point based on the detected pixel values. The document discriminating unit discriminates whether the document is a color document or a black-and-white document based on the detected pixel values while treating the pixels, of which the color has been determined to be the specific color by the pixel color determining unit and which have been determined to be isolated points by the isolated point determining unit, as black-and-white pixels.

9 Claims, 4 Drawing Sheets

FIG. 2

| D0 | D1 | D2 |
|----|----|----|
| D3 | D4 | D5 |
| D6 | D7 | D8 |

FIG. 3

| 0  | -1 | 0  |
|----|----|----|
| -1 | 5  | -1 |
| 0  | -1 | 0  |

| -1 | -1 | -1 |
|----|----|----|
| -1 | 9  | -1 |
| -1 | -1 | -1 |

FIG. 5A
FIG. 5B
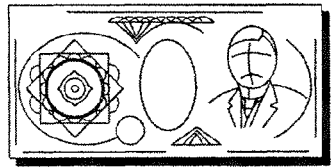
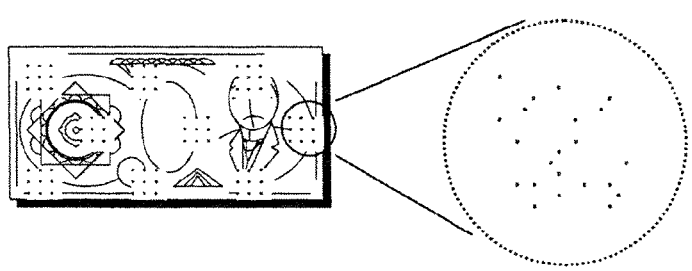

IMAGE PROCESSING APPARATUS AND METHOD FOR DISCRIMINATING WHETHER DOCUMENT IS COLOR DOCUMENT OR BLACK AND WHITE DOCUMENT, IMAGE FORMING APPARATUS AND FACSIMILE MACHINE INCLUDING THE IMAGE PROCESSING APPARATUS AND COMPUTER READABLE RECORDING MEDIUM STORING IMAGE PROCESSING PROGRAM

BACKGROUND OF THE INVENTION

1. Field of the Invention

The present invention relates to an image processing apparatus and an image processing method for automatically discriminating whether a document is a color document or a black-and-white document, an image forming apparatus and a facsimile machine including the image processing apparatus, and a computer readable recording medium storing an image processing program.

2. Description of the Background Art

Some of color complex machines and color scanners have an automatic color document discrimination function of automatically discriminating whether a document is a color document or a black-and-white document based on image data obtained by scanning the document with an image reader. For example, a certain exemplary apparatus includes a mechanism which discriminates whether each pixel (or area) is chromatic color or achromatic color based on a predetermined threshold value from a plurality of color component signals of the pixel, and determines that the document is a color document if a ratio of chromatic pixels (or areas) to the total pixels (or total area) is larger than a predetermined threshold value. In other words, the document is determined to be a color document if the chromatic pixels (or areas) account for a predetermined area or larger on the document while being determined to be a black-and-white document unless otherwise. By controlling color/black-and-white copying (scanning) according to this determination result, a user needs not instruct color/black-and-white copying (scanning) for each document, whereby convenience is improved.

With the increase in the use of color complex machines and color printers in offices and the like in recent years, print outputs from color complex machines and color printers are more frequently used as documents to be copied/scanned.

With an increase in image quality of color complex machines, color scanners and printers, it has now become possible for anybody to easily obtain a copy true to a document image. This has led to a higher possibility of easily forging copy prohibited documents such as bank notes and valuable securities. Importance has been and is being placed on forgery prevention means to counteract against this and, as one of these, a technology is known which specifies information such as the manufacturer, model name and serial number of a machine used for copying or printing, output date and time by writing a normally invisible special code (tracking pattern) in an output itself. If a document shown in FIG. 5A for example is copied by a copier to which such a technology is applied, an output is made with a tracking pattern represented by an arrangement of small dots (each dot made of one pixel for instance) in a predetermined block superimposed on an image. The tracking pattern is generally formed of a yellow color material which is difficult to visually confirm.

The present invention is a further improvement of the above prior art.

SUMMARY OF THE INVENTION

An image processing apparatus according to one aspect of the present invention includes an image reading unit, a pixel color determining unit, an isolated point determining unit, and a document discriminating unit. The image reading unit scans a document to detect pixel values of a plurality of color components of each pixel. The pixel color determining unit determines whether or not a color of each pixel is a specific color based on the pixel values of the plurality of color components of each pixel detected by the image reading unit. The isolated point determining unit determines whether or not each pixel is an isolated point based on the pixel values of the plurality of color components of each pixel detected by the image reading unit. The document discriminating unit discriminates whether the document is a color document or a black-and-white document based on the pixel values of the plurality of color components of each pixel detected by the image reading unit while treating the pixels, of which the color has been determined to be the specific color by the pixel color determining unit and which have been determined to be isolated points by the isolated point determining unit, as black-and-white pixels.

An image forming apparatus according to another aspect of the present invention includes the above image processing apparatus, and an image forming unit that forms an image on a sheet. The image processing apparatus further includes an image processing unit and an image output unit. The image processing unit performs an image processing on the pixel values detected by the image reading unit according to a discrimination result by the document discriminating unit. The image output unit outputs an image processing result by the image processing unit to the image forming unit. The image forming unit forms the image based on an output from the image output unit.

A facsimile machine according to still another aspect of the present invention includes the above image processing apparatus, and a transmitting unit that transmits an image outside. The image processing apparatus further includes an image processing unit and an image output unit. The image processing unit performs an image processing on the pixel values detected by the image reading unit according to a discrimination result by the document discriminating unit. The image output unit outputs an image processing result by the image processing unit to the transmitting unit. The transmitting unit transmits the image based on an output from the image output unit.

An image processing method according to still another aspect of the present invention includes an image reading step, a pixel color determining step, an isolated point determining step, and a document discriminating step. In the image reading step, a document is scanned to detect pixel values of a plurality of color components of each pixel. In the pixel color determining step, whether or not a color of each pixel is a specific color is determined based on the pixel values of the plurality of color components of each pixel detected in the image reading step. In the isolated point determining step, whether or not each pixel is an isolated point is determined based on the pixel values of the plurality of color components of each pixel detected in the image reading step. In the document discriminating step, whether the document is a color document or a black-and-white document is discriminated based on the pixel values of the plurality of color components of each pixel detected in the image reading step while the pixels, of which the color has been determined to be the specific color in the pixel color determining step and which have been determined to be isolated points in the isolated point determining step, are treated as black-and-white pixels.

A non-transitory computer readable recording medium according to still another aspect of the present invention is a recording medium that stores an image processing program which causes a computer to function as an image processing apparatus. The program causes the computer to function as an image reading unit, a pixel color determining unit, an isolated point determining unit, and a document discriminating unit. The image reading unit scans a document to detect pixel values of a plurality of color components of each pixel. The pixel color determining unit determines whether or not a color of each pixel is a specific color based on the pixel values of the plurality of color components of each pixel detected by the image reading unit. The isolated point determining unit determines whether or not each pixel is an isolated point based on the pixel values of the plurality of color components of each pixel detected by the image reading unit. The document discriminating unit discriminates whether the document is a color document or a black-and-white document based on the pixel values of the plurality of color components of each pixel detected by the image reading unit while treating the pixels, of which the color has been determined to be the specific color by the pixel color determining unit and which have been determined to be isolated points by the isolated point determining unit, as black-and-white pixels.

These and other objects, features and advantages of the present invention will become more apparent upon reading the following detailed description along with the accompanying drawings.

BRIEF DESCRIPTION OF THE DRAWINGS

FIG. 2 is a diagram for describing a target pixel and surrounding pixels.

FIG. 3 is a diagram showing examples of a coefficient of an edge enhancement filter.

FIG. 5A is a diagram showing an example of a document and FIG. 5B is a diagram showing a tracking pattern superimposed on an output image when the document of FIG. 5A is copied.

DETAILED DESCRIPTION OF THE PREFERRED EMBODIMENTS

An image processing apparatus according to one embodiment of the present invention is described below with reference to the drawings.

Figure 1:
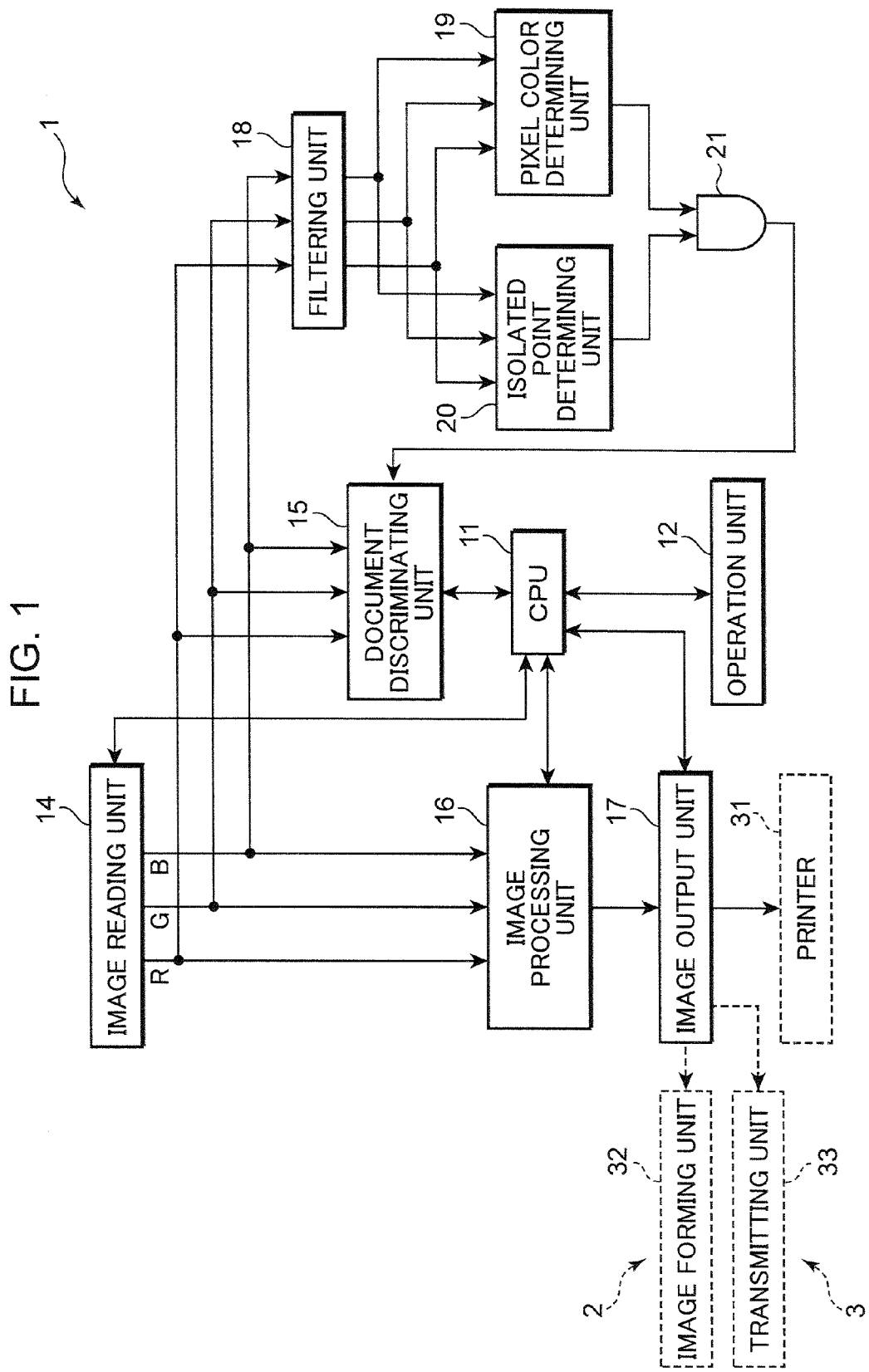
FIG. 1 is a block diagram showing the construction of an image processing apparatus according to one embodiment of the invention.

FIG. 1 is a block diagram showing the construction of an image processing apparatus 1 according to the embodiment of the present invention, FIG. 2 is a diagram for describing a target pixel and surrounding pixels, and FIG. 3 is a diagram showing examples of a coefficient of an edge enhancement filter. This image processing apparatus 1 is an apparatus that reads a document, outputs a read document image to an external apparatus such as a printer 31 (shown in broken line in FIG. 1), and includes a CPU 11.

The CPU 11 is responsible for an overall operation control of the image processing apparatus 1. An operation unit 12, an image reading unit 14, a document discriminating unit 15, an image processing unit 16 and an image output unit 17 are connected to the CPU 11. The image reading unit 14 is connected to the document discriminating unit 15, the image processing unit 16 and a filtering unit 18. The filtering unit 18 is connected to a pixel color determining unit 19 and an isolated point determining unit 20. The pixel color determining unit 19 and the isolated point determining unit 20 are respectively connected to an input side of a gate circuit 21 with two inputs and one output, and an output side of the gate circuit 21 is connected to the document discriminating unit 15.

The operation unit 12 is for receiving operations by a user such as operation start. The operation unit 12 is configured to be able to set any one of a color mode, a black-and-white mode and an automatic color document discrimination mode as a document reading mode upon outputting a document image.

The image reading unit 14 scans a document to detect pixel values of a plurality of color components (three components of R, G and B in this embodiment for example) for each pixel, and sends the detected pixel values of the respective color components as image data to the document discriminating unit 15, the image processing unit 16 and the filtering unit 18. The pixel values (image data) are multi-value data of 256 gradations (8 bits) of 0 to 255 for instance.

Mode information set in the operation unit 12 is sent to the CPU 11. The CPU 11 controls the image processing unit 16 based on the mode information sent from the operation unit 12. The CPU 11 also controls the image processing unit 16 based on a discrimination result by the document discriminating unit 15 in the case of the automatic color document discrimination mode. The image processing unit 16 performs an image processing corresponding to the mode information and the discrimination result of the document discriminating unit 15 on the image data sent from the image reading unit 14 in accordance with a control of the CPU 11 and outputs the processed image data to the image output unit 17. The image output unit 17 outputs the processed image data sent from the image processing unit 16 outside.

The filtering unit 18 performs an edge enhancement process by performing a digital filtering process using a predetermined coefficient on the received image data of the respective color components of R, G and B. The digital filtering process is realized by a product-sum operation of an arbitrary target pixel and its surrounding pixels of an image and predetermined coefficients. In this embodiment, a 3×3 digital filter having filter coefficients as shown in FIG. 3 is used for a target pixel D4 to be processed and eight pixels D0 to D3, D5 to D8 surrounding the target pixel D4 shown in FIG. 2. Although two filter coefficients are illustrated in FIG. 3, the filter coefficients are not limited to these, and edge enhancement filters having other filter coefficients may be used. According to this construction, accuracy in determining a pixel color or an isolated point can be improved by making a determination based on the pixel values filtered using the edge enhancement filter.

The pixel color determining unit 19 determines the colors of the respective pixels while referring to the image data sent from the filtering unit 18 and sends an output signal corresponding to a determination result to the gate circuit 21 provided at a subsequent stage. The pixel color determining unit 19, for example, refers to the pixel values of the R, G and B components in each pixel, determines the pixel, of which the pixel values of the R and G components are respectively larger than a predetermined value and of which the pixel value of the B component is smaller than a predetermined value, as a yellow pixel, and outputs a signal "1" to the subsequent stage. On the other hand, the pixel color determining unit 19 outputs a signal "0" for the pixel determined not to be a yellow pixel. Yellow pixels including a tracking pattern are extracted by this pixel color determining unit 19. Note that a color space used for determination of pixel colors needs not necessarily be an RGB color space and pixel colors may be determined using another color space such as a CMY, HSL or HSV color space. It is assumed in this embodiment that the tracking pattern is constituted by yellow pixels.

The isolated point determining unit 20 determines whether or not each pixel is an isolated point. In this embodiment, a method described below is, for example, employed as a method for determination on isolated points. Specifically, the isolated point determining unit 20 calculates an average value of pixel values in a predetermined range centered on a certain target pixel, calculates an absolute value of a difference between the calculated average value and the pixel value of the target pixel, and determines the target pixel to be an isolated point and outputs a signal "1" to the subsequent stage if the absolute value is larger than a predetermined threshold value. The isolated point determining unit 20 outputs a signal "0" for other pixels.

Specifically, if it is, for example, assumed in FIG. 2 that D0 to D8 denote pixel values of the respective pixels, Dth denotes the threshold value and Dave denotes an average value of the pixel values of the respective pixels, that is, $$Dave=(D0+D1+D2+D3+D4+D5+D6+D7+D8)/9,$$

the target pixel D4 is determined to be an isolated point when |D4−Dave|>Dth. Note that the isolated point determination method is not limited to this.

The gate circuit 21 performs an AND operation of output signals of the pixel color determining unit 19 and the isolated point determining unit 20 and sends the operation result to the document discriminating unit 15. In other words, the gate circuit 21 sends a signal "1" to the document discriminating unit 15 when the pixel color determining unit 19 determines the pixel color to be yellow and outputs a signal "1" and the isolated point determining unit 20 determines the pixel to be an isolated point and outputs a signal "1", and sends a signal "0" to the document discriminating unit 15 in other cases.

By determining the yellow pixels in the pixel color determining unit 19 and determining the pixels as isolated points in the isolated point determining unit 20, yellow isolated points constituting the tracking pattern can be extracted from the document image read by the image reading unit 14.

The document discriminating unit 15 discriminates whether each pixel is color or black-and-white by referring to the signals sent from the gate circuit 21 in addition to the pixel values (image data) of the R, G and B components sent from the image reading unit 14, and discriminates whether the document is a color document or a black-and-white document based on the discrimination result. Note that a known technology conventionally proposed, for example, in Japanese Unexamined Patent Publications Nos. 2001-128024 and 2003-319193 may be used for a specific color document discrimination process in the document discriminating unit 15.

Specifically, pixel values of R (red), G (green) and B (blue) components of a target pixel P are, for example, denoted by Pr, Pg and Pb. At this time, the document discriminating unit 15 uses a pixel discrimination criterion of judging that the target pixel P is a color pixel when at least one condition is satisfied out of three conditions; a condition that a difference between the pixel values Pb and Pg is larger than a predetermined threshold value, a condition that a difference between the pixel values Pg and Pr is larger than the predetermined threshold value and a condition that a difference between the pixel values Pr and Pb is larger than the predetermined threshold value. Further, the document discriminating unit 15 uses a document discrimination criterion of incrementing a count value of color pixels by 1 when the target pixel P is judged to be a color pixel, repeating this for each pixel and discriminating that the read document is a color document when the number of counted color pixels reaches a threshold value set beforehand.

In this embodiment, the document discriminating unit 15 discriminates whether the document is a color document or a black-and-white document while treating the pixels, for which the signal "1" is sent from the gate circuit 21, that is, pixels that are yellow and isolated points, as the pixels constituting the tracking pattern and as black-and-white pixels. In other words, the count value of the color pixels is not incremented for the pixels that are yellow and isolated points.

Figure 4:
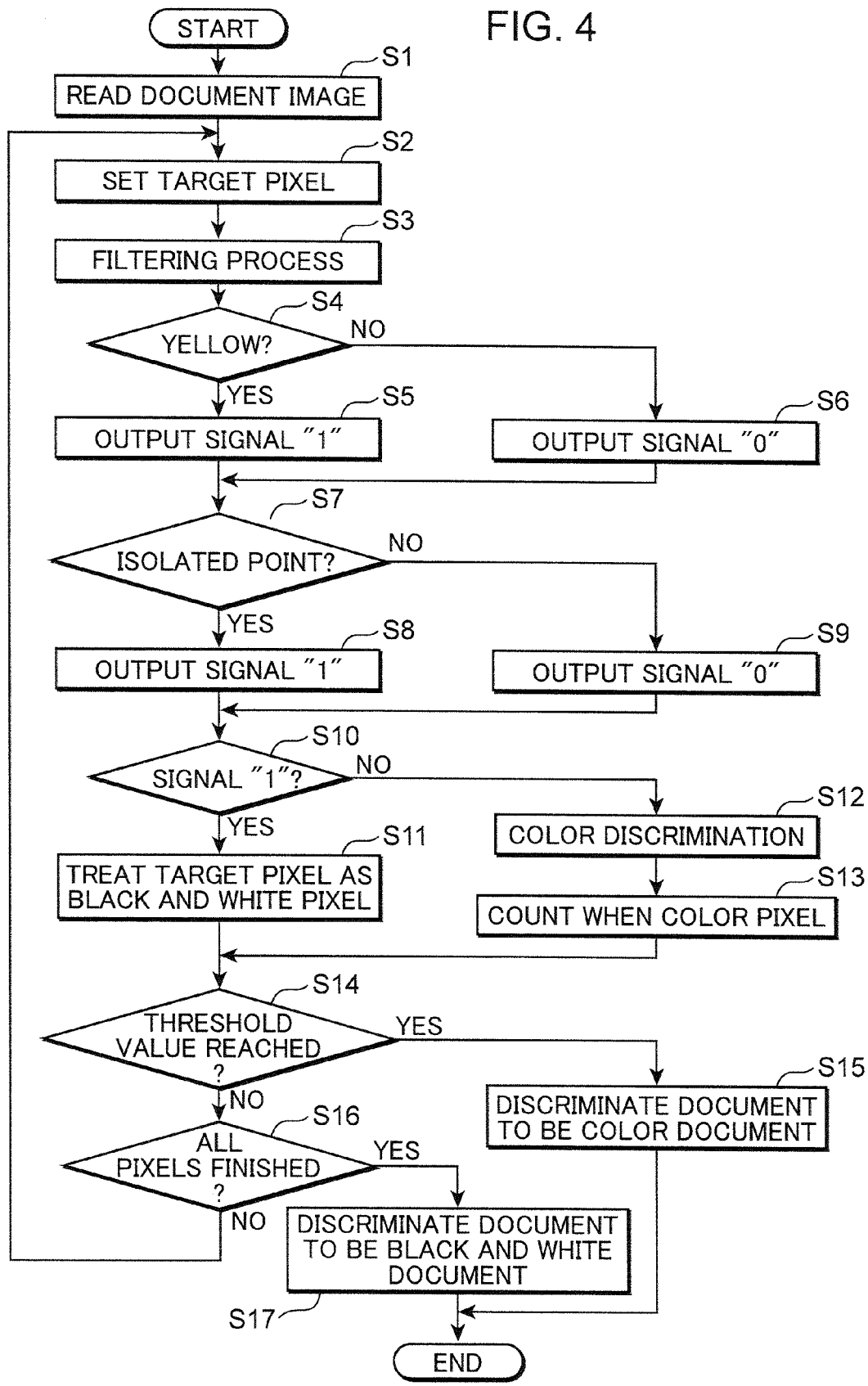
FIG. 4 is a flow chart showing a document discriminating operation in an automatic color document discrimination mode.

FIG. 4 is a flow chart showing a document discrimination operation in the automatic color document discrimination mode. First, a document image is read by the image reading unit 14 and pixel values of the R, G and B components are sent pixel by pixel to the document discriminating unit 15, the image processing unit 16 and the filtering unit 18 (Step S1).

Subsequently, a target pixel as a pixel to be processed is set (Step S2). Normally, pixels are successively set as this target pixel from the leading pixel of the document. Subsequently, the filtering process is performed for the respective R, G and B components of the target pixel by the filtering unit 18 (Step S3), and then, the color of the target pixel is determined by the pixel color determining unit 19 (Step S4). If the target pixel is yellow (YES in Step S4), a signal "1" is output (Step S5), whereas, if the target pixel is not yellow (NO in Step S4), a signal "0" is output (Step S6).

Subsequently, whether or not the target pixel is an isolated point is determined by the isolated point determining unit 20 (Step S7). If the target pixel is an isolated point (YES in Step S7), a signal "1" is output (Step S8), whereas if the target pixel is not an isolated point (NO in Step S7), a signal "0" is output (Step S9).

Subsequently, if an input signal from the gate circuit 21 to the document discriminating unit 15 is "1" (YES in Step S10), the target pixel is treated as a black-and-white pixel in the document discriminating unit 15 (Step S11), and the flow proceeds to Step S14 without incrementing the count value of color pixels. On the other hand, if the input signal is "0" (NO in Step S10), the color of the target pixel is discriminated (Step S12), the count value of the color pixels is incremented by one (Step S13) if the target pixel is a color pixel, and the flow proceeds to Step S14.

In Step S14, whether or not the count value of the color pixels has reached a threshold value set beforehand is determined. If the threshold value has been reached (YES in Step S14), this document is discriminated to be a color document (Step S15) and this process is finished.

On the other hand, unless the count value of the color pixels has reached the threshold value (NO in Step S14), whether or not discrimination of all the pixels of the document has been finished is determined (Step S16). Unless discrimination of all the pixels of the document has been finished (NO in Step S16), the flow returns to Step S2 to set a next target pixel and the above routine is repeated. On the other hand, if discrimination of all the pixels of the document has been finished (YES in Step S16), the document is discriminated to be a black-and-white document (Step S17) and this process is finished.

As described above, according to this embodiment, yellow pixels are extracted by determining the colors of the pixels by the pixel color determining unit 19 and the pixels as isolated points are extracted by determining whether or not the pixels are isolated points by the isolated point determining unit 20. Whether the document is a color document or a black-and-white document is discriminated based on the pixel values of the respective pixels by the document discriminating unit 15 while the pixels, which are yellow and isolated points, are treated as black-and-white pixels. Thus, whether the document is a color document or a black-and-white document can be discriminated without being influenced by the presence or absence of a tracking pattern. In other words, a document which is imprinted with a tracking pattern constituted by yellow pixels and whose pixels other than the yellow pixels are all black-and-white pixels can be discriminated to be a black-and-white document.

Although the document discriminating unit 15 treats the pixels, for which the signal "1" is sent from the gate circuit 21, that is, the pixels that are yellow and isolated points, as the pixels constituting the tracking pattern and as black-and-white pixels in the above embodiment, the pixels, for which the signal "1" is sent from the gate circuit 21, may be converted into achromatic pixels. By such conversion into achromatic pixels, the pixels, for which the signal "1" is sent from the gate circuit 21, are treated as black-and-white pixels and the count value of the color pixels is not incremented.

Although the filtering unit 18 is provided to perform the edge enhancement process in the above embodiment, it is not essential to perform the edge enhancement process. However, accuracy in determining the pixel color of the target pixel and whether or not the target pixel is an isolated point can be improved by performing the edge enhancement process as in the above embodiment.

Although the gate circuit 21 is provided in the above embodiment, it is not essential. For example, the pixel color determining unit 19 and the isolated point determining unit 20 may be respectively directly connected to the document discriminating unit 15 without providing the gate circuit 21. Further, the signals "1", "0" output from the pixel color determining unit 19 and the isolated point determining unit 20 are only examples and any signals, with which the document discriminating unit 15 can distinguish the determination results, may be used.

In the above embodiment, the respective blocks of the document discriminating unit 15, the filtering unit 18, the pixel color determining unit 19, the isolated point determining unit 20 and the gate circuit 21 may be realized by a hardware logic or by software using a computer. In the case of realization by software, the above respective blocks include a CPU (central processing unit), a ROM (read only memory), a RAM (random access memory), etc. and are realized by developing a program read from the ROM on the RAM by the CPU. In other words, effects similar to those of this embodiment can also be obtained by a program which causes an information processing apparatus such as a computer including a detector that detects pixel values of a plurality of color components and the like to function as the image reading unit 14, the document discriminating unit 15, the filtering unit 18, the pixel color determining unit 19, the isolated point determining unit 20 and the gate circuit 21. Note that the CPU in this case may be provided separately from the CPU 11 or the CPU 11 may additionally include functions of the respective blocks.

The ROM that stores the above program functions as a non-transitory computer readable recording medium. The above information processing apparatus such as a computer may include a reader that reads a computer readable recording medium, for example, such as a magnetic disk, an optical disk or a semiconductor memory which stores the above program and may read the program from the recording medium to execute it.

In the case of realizing the pixel color determining unit 19 and the isolated point determining unit 20 by software, Steps S4 to S6 and Steps S7 to S9 may be transposed to be performed in FIG. 4. Further, in the case of realizing the pixel color determining unit 19 and the isolated point determining unit 20 by a hardware logic, Steps S4 to S6 and Steps S7 to S9 may be concurrently performed.

Although the image processing apparatus 1 reads a document and outputs a read document image to an external apparatus such as the printer 31 (shown in broken line in FIG. 1) in the above embodiment, the present invention is not limited to this. For example, in an image forming apparatus 2 such as a copier including the built-in image processing apparatus 1 and an image forming unit 32 as shown in broken line in FIG. 1, the image processing apparatus 1 may output a read document image to the image forming unit 32 from the image output unit 17 and the image forming unit 32 may form an image on a sheet. According to this image forming apparatus 2, a high-quality image can be formed on a sheet since whether a document is a color document or a black-and-white document can be discriminated with high accuracy. Further, for example, in a facsimile machine 3 including the built-in image processing apparatus 1 and a transmitting unit 33 as shown in broken line in FIG. 1, the image processing apparatus 1 may output a read document image to the transmitting unit 33 from the image output unit 17 and image data may be externally transmitted by the transmitting unit 33. According to this facsimile machine 3, a high-quality image can be transmitted since whether a document is a color document or a black-and-white document can be discriminated with high accuracy.

When a document is a print output from a color complex machine or a printer, it may be imprinted with a yellow tracking pattern by the information specifying technology described in the above "Description of the Background Art" although the document itself is a black-and-white document at first glance. In this case, there is a possibility that an automatic color document discrimination result indicates a color document because of the imprinted yellow tracking pattern although the document is a black-and-white document. This results in an output unintended by a user, for example, such as consumption of color toners when a copy is generated.

On the contrary, according to the above image processing apparatus, a pixel whose color is determined to be a specific color and which is determined to be an isolated point is treated as a black-and-white pixel. Since the above tracking pattern is constituted by pixels whose color is the specific color and which are isolated points, the pixels constituting the tracking pattern are treated as black-and-white pixels. Since whether a document is a color document or a black-and-white document is discriminated based on pixel values of a plurality of color components of each pixel while the pixels constituting the tracking pattern are treated as black-and-white pixels, whether the document is a color document or a black-and-white document can be discriminated without being influenced by the tracking pattern even if the document is imprinted with the tracking pattern.

This application is based on Japanese Patent application No. 2010-147364 filed in Japan Patent Office on Jun. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising:
an image reading unit that scans a document to detect pixel values of a plurality of color components of each pixel;
a pixel color determining unit that determines whether or not a color of each pixel is yellow based on the pixel values of the plurality of color components of each pixel detected by the image reading unit;
an isolated point determining unit that determines whether or not each pixel is an isolated point based on the pixel values of the plurality of color components of each pixel detected by the image reading unit; and
a document discriminating unit that discriminates whether the document is a color document or a black-and-white document based on the pixel values of the plurality of color components of each pixel detected by the image reading unit while treating, without removing the isolated points determined by the isolated point determining unit, the pixels, the color of which has been determined to be the yellow by the pixel color determining unit and which have been determined to be isolated points by the isolated point determining unit, as black-and-white pixels.

2. The image processing apparatus according to claim 1, further comprising a filtering unit that performs a filtering process using an edge enhancement filter on the pixel values of the plurality of color components of each pixel detected by the image reading unit and outputs the filtered pixel values to at least one of the pixel color determining unit and the isolated point determining unit.

3. The image processing apparatus according to claim 1, wherein
the image reading unit detects the pixel values of red, green and blue color components as the pixel values of the plurality of color components, and
the pixel color determining unit determines the pixel, of which the pixel values of the red and the green components detected by the image reading unit are respectively larger than a predetermined value and of which the pixel value of the blue component is smaller than a predetermined value, as the yellow pixel.

4. The image processing apparatus according to claim 1, wherein the isolated point determining unit calculates an average value of pixel values in a predetermined range centered on a target pixel to be processed, calculates an absolute value of a difference between the calculated average value and the pixel value of the target pixel, and determines the target pixel to be an isolated point when the calculated absolute value is larger than a predetermined threshold value.

5. An image forming apparatus, comprising:
the image processing apparatus according to claim 1; and
an image forming unit that forms an image on a sheet, wherein
the image processing apparatus further includes an image processing unit that performs an image processing on the pixel values detected by the image reading unit according to a discrimination result by the document discriminating unit, and an image output unit that outputs an image processing result by the image processing unit to the image forming unit, and
the image forming unit forms the image based on an output from the image output unit.

6. A facsimile machine, comprising:
the image processing apparatus according to claim 1; and
a transmitting unit that transmits an image outside, wherein
the image processing apparatus further includes an image processing unit that performs an image processing on the pixel values detected by the image reading unit according to the discrimination result by the document discriminating unit, and an image output unit that outputs the image processing result by the image processing unit to the transmitting unit, and
the transmitting unit transmits the image based on the output from the image output unit.

7. The image processing apparatus according to claim 1, wherein
the document is imprinted with a tracking pattern by an information specifying technology, and
the tracking pattern is constituted by the yellow.

8. An image processing method, comprising:
an image reading step of scanning a document to detect pixel values of a plurality of color components of each pixel;
a pixel color determining step of determining whether or not a color of each pixel is yellow based on the pixel values of the plurality of color components of each pixel detected in the image reading step;
an isolated point determining step of determining whether or not each pixel is an isolated point based on the pixel values of the plurality of color components of each pixel detected in the image reading step; and
a document discriminating step of discriminating whether the document is a color document or a black-and-white document based on the pixel values of the plurality of color components of each pixel detected in the image reading step while treating, without removing the isolated points determined by the isolated point determining step, the pixels, of which the color has been determined to be the yellow in the pixel color determining step and which have been determined to be the isolated points in the isolated point determining step, as black-and-white pixels.

9. A non-transitory computer readable recording medium that stores an image processing program which causes a computer to function as an image processing apparatus, the program causing the computer to function as:
an image reading unit that scans a document to detect pixel values of a plurality of color components of each pixel;
a pixel color determining unit that determines whether or not a color of each pixel is yellow based on the pixel values of the plurality of color components of each pixel detected by the image reading unit;
an isolated point determining unit that determines whether or not each pixel is an isolated point based on the pixel values of the plurality of color components of each pixel detected by the image reading unit; and
a document discriminating unit that discriminates whether the document is a color document or a black-and-white document based on the pixel values of the plurality of color components of each pixel detected by the image reading unit while treating, without removing the isolated points determined by the isolated point determining unit, the pixels, of which the color has been determined to be the yellow color by the pixel color determining unit and which have been determined to be the isolated points by the isolated point determining unit, as black-and-white pixels.

* * * * *